3,418,314
PROCESS FOR THE PRODUCTION OF LACTAMS
Hanshelmut Schwarz, Krefeld-Bockum, Joachim Schneider and Hermann Schnell, Krefeld-Uerdingen, and Otto Immel, Krefeld-Gartenstadt, Germany, assignors to Farbenfabriken Bayer Aktiengesellschaft, Leverkusen, Germany, a German corporation
No Drawing. Filed Feb. 19, 1965, Ser. No. 434,111
Claims priority, application Germany, Feb. 24, 1964, F 42,129
9 Claims. (Cl. 260—239.3)

ABSTRACT OF THE DISCLOSURE

This invention relates to an improved process for the production of lactams by molecular rearrangement of cycloalkanone oxime in gaseous phase in the presence of a solid aluminum containing catalyst.

---

It is known to produce lactams by the molecular rearrangement of cycloalkanone oximes in the heterogeneous phase, the oximes, which may be mixed with inert gaseous materials, being conducted over a solid catalyst at elevated temperature. Compared with the usual molecular rearrangement of the oximes in the homogeneous phase, which process uses stoichiometrical quantities of strong mineral acids, this method has the advantage, among other things, that no inorganic byproducts such as ammonium sulphate are produced.

Hitherto, it has been found that the most suitable catalysts for the catalytic molecular rearrangement in the heterogeneous phase are weak acid catalysts such as phosphates or mixtures thereof as well as boron compounds, especially boric acid, which are applied to carrier materials which have been pretreated by known surface treatment methods of a thermal or chemical nature. However, even with these catalysts it is not possible to obtain a volume-time yield which is satisfactory for technical purposes. Neither the rates of reaction nor the yields would satisfy the requirements that have to be made of a large scale technical process.

Apart from the above-mentioned catalysts, it has also been proposed to use fuller's earth with an addition of 4% of hydrofluoric acid as catalyst for the above purpose. However, this catalyst is greatly inferior to the other known catalysts both in the yields that can be achieved and in its length of life.

It has now been found that lactams can be obtained with considerably improved volume-time yields by molecular rearrangemet of cycloalkanone oximes in the gaseous phase, if desired mixed with inert gaseous materials, in the presence of acid catalysts at elevated temperature (and if desired under reduced or elevated pressure) if the rearrangement is carried out with the use of aluminum oxides which may if desired be active and which may if desired contain alkali metal oxides and/or alkaline earth oxides and/or oxides of metals of the third and/or fourth main and subgroup of the Periodic System and/or heavy metal oxides, to which have been added volatile fluorine compounds, or with the use of the above-mentioned aluminum oxides which do, however, in addition also contain fluorine, if desired with addition of volatile fluorine compounds, or with the use of aluminum fluoride, if desired mixed with the said aluminum oxide and if desired with addition of volatile fluorine compounds.

Suitable aluminum oxides are obtainable, for example, by dehydration of $a$- and $\beta$-aluminum monohydrate and -trihydrate or from bauxite. Other oxides which may be present with the aluminum oxides are, for example, sodium oxide, potassium oxide, boron oxide, silicium dioxide, titanium dioxide, iron(III)-oxide etc. in quantities of up to about 35%. Additionally good results were obtained using aluminum oxide containing up to 95% of silicium dioxide in form of a silicate. Especially good results are generally obtained with the use of active aluminum oxides which may be either active by nature or artificially activated by known processes.

Aluminum oxides which contain fluorine can easily be obtained from the aluminum oxides by treating them with fluorine compounds or mixtures of fluorine compounds. Thus the aluminum oxides may, for example, be mixed, vapour treated, saturated or otherwise brought into contact with neutral or acid salts of hydrofluoric acid, if desired also with complex fluorine-containing acids or their salts or with gases containing fluorine, if desired in the presence of water. This may be followed by an after-treatment, for example by drying or calcining, if desired in vacuo. Good results are obtained, for example, when aluminum oxides are saturated with aqueous solutions of fluorine-containing compounds, separated from the aqueous phase after some time, dried and tempered.

Suitable fluorine compounds for this purpose are, for example, alkali metal hydrogen fluorides, ammonium fluoride, ammonium hydrogen fluoride, boron fluoride, tetrafluoroboric acid, silicon tetrafluoride, hexafluorosilic acid and antimony fluoride.

The fluorine content of the catalysts used according to the invention may vary within wide limits. It may, for example, be between about 0.01% by weight and about 70% by weight, preferably at least about 0.1% by weight. In particular, good catalysts were obtained, when the fluorine containing aluminum oxide is treated with an aqueous solution of alkalimetal hydroxides and successively dried.

The calcining of the treated catalysts is suitably carried out at temperatures between 150 and 1000° C., preferably at 250 to 600° C.

It is also possible to use, instead of fluorine-containing aluminum oxides, aluminum fluoride or mixtures of aluminum fluoride and aluminum oxides. In this latter case, for example, aluminum fluorohydrate, if desired mixed with aluminum hydroxides or aluminum oxides, can be broken into lumps and heated for some hours to about 300 to about 600° C., preferably about 500° C. The time required for calcining is up to about 15, preferably about 3 to 8 hours for all of the above-mentioned catalysts.

In another advantageous embodiment of the process according to the invention, the aluminum oxides normally used as catalysts, (which may, if desired, be active aluminum oxides and which may contain fluorine, or aluminum fluoride or mixtures of aluminum fluoride and the said aluminum oxides) are used and the oxime which is to undergo molecular rearrangement is conducted over these catalysts in a mixture with volatile fluorine compounds. Suitable volatile fluorine compounds for this purpose are mainly hydrogen fluoride, boron trifluoride and silicon tetrafluoride in quantities of about 0.001 to about 10, preferably about 0.1 to about 3% by weight calculated on the oxime. After the molecular rearrangement, the volatile fluorine compounds may be removed from the resulting lactam by simple customary measures such as distillation over bases such as sodium hydroxide, calcium hydroxide or calcium oxide, etc.

The molecular rearrangement of the oximes by the process according to the invention is suitably carried out at temperatures between about 150 and 600° C., preferably about 250 to 450° C.

The pressure may vary within wide limits. The process may be carried out at reduced or, if desired, at elevated pressure. Thus, for example, the rearrangement may be carried out at pressures between about 0.1 and about 1000 mm. Hg.

The rearrangement of oximes with the catalysts according to the invention is suitably carried out by conducting the vaporous oximes, if desired mixed with inert gaseous materials such as nitrogen, carbon dioxide or steam and if desired mixed with volatile fluorine compounds over the fixed catalysts or through a catalyst fluidized bed under the given conditions. Catalyst loads of up to 4 kg. of oxime per kg. of catalyst per hour can easily be achieved. Under these conditions it is possible, for example, to obtain a yield of 87% of the theoretical yield of lactam with 100% conversion of the oxime. The results obtainable with the known catalysts are considerably lower than this. Thus, for example, when using aluminum oxide which contains boric acid, the best result obtained is a conversion of about 85% with a yield of about 84% at a catalyst load of only 0.7 kg. of oxime per kg. of catalyst per hour, whereas when fuller's earth containing hydrofluoric acid is used as catalyst, conversions of only about 56% and yields of about 50% calculated on the converted oxime are obtainable at a catalyst load of 1.5 kg. of oxime per kg. of catalyst per hour. The oximes may be conducted onto the contact in liquid form. This is advantageous for the reason that the reaction heat is partially compensated by the melt or evaporation heat.

The process according to the invention differs from the known processes also in that the catalysts have an improved length of life so that regeneration is necessary only after prolonged operation. The regeneration may be carried out simply by passing air over the catalyst at 400 to 800° C. without the activity of the catalyst being significantly impaired. If desired, the catalysts may also be given a renewed treatment with fluorine compounds in the manner indicated.

By the process according to the invention, molecular rearrangement of cycloalkanone oximes containing 5 and more ring members gives rise to the corresponding lactams such as the lactams of ω-aminovaleric acid, ε-aminocaproic acid, ω-aminocaprylic acid, ω-aminoundecanoic acid and ω-aminolauric acid in good yields. A water content of, for example, 10% in the oximes does not impair the process.

The following examples illustrate in particular the invention. The percentages given in these examples are percentages by weight.

Example 1

20 g. of aluminum oxide of 0.5–1 mm. grain size and having the composition

| | Percent |
|---|---|
| $Al_2O_3$ | 92 |
| $Na_2O$ | 1 |
| $Fe_2O_3$ | 0.1 |
| $SiO_2$ | 2 |
| $TiO_2$ | 0.1 |
| Loss by heating | 4.8 | were saturated with a solution of 5 g. of ammonium hydrogen fluoride in 30 ml. $H_2O$ for 3 hours at 20° C. and then suction-filtered, dried at 110° C. and then heated for 5 hours at 500° C. The fluorine content of the catalyst was then 3.8%.

100 g. of cyclohexanone oxime were then conducted within 5 hours at 3 mm. Hg over 5 g. of the resulting catalyst which was situated at the end of a reaction coil which was 1 m. in length and 22 mm. in diameter and was heated to 400° C. by a salt bath. The conversion was 100%, the yield of caprolactam 87 g. corresponding to 87% of the theoretical value.

Example 2

20 g. of aluminum oxide of 0.5–1 mm. grain size and of the composition

| | Percent |
|---|---|
| $Al_2O_3$ | 93 |
| $Na_2O$ | 0.5 |
| $Fe_2O_3$ | 0.3 |
| $SiO_2$ | 1.5 |
| $TiO_2$ | 0.2 |
| Loss by heating | 4.5 | were mixed with 30 ml. of 10% hydrofluoric acid at 20° C., vacuum filtered after 3 hours, dried at 110° C. and then heated for 8 hours at 450 to 500° C. The fluorine content was then 2.1%.

100 g. of cyclohexanone oxime were then passed over 5 g. of the resulting catalyst in the apparatus described in Example 1 at 350° C. and 3 mm. Hg in 5 hours. At a conversion rate of 87%, the yield of caprolactam was 81 g., corresponding to a yield of 81% of the amount introduced into the reaction and 93% of the converted cyclohexanone oxime.

Example 3

30 g. of aluminum oxide of grain size 0.5–1 mm. and of the composition given in Example 1 were mixed with 15 g. of ammonium hydrogen fluoride in 70 ml. of water at 20° C. and suction-filtered after one hour, dried at 110° C. and then heated for 5 hours at 550° C. The fluorine content was then 0.2%.

100 g. of cyclohexanone oxime were then passed over 10 g. of the resulting catalyst in the apparatus described in Example 1 for 8 hours at 6mm. Hg and 420° C. At a conversion rate of 80%, the yield of caprolactam was 72 g. corresponding to 72% of the amount of reactant introduced into the process and 90% of the converted cyclohexanone oxime.

Example 4

Aluminum fluoride·$3H_2O$ was heated for 5 hours at 500° C., broken up into pieces and a fraction of grain size 0.5 to 1 mm. was separated by screening.

100 g. of cyclohexanone oxime were passed over 10 g. of the resulting catalyst in the apparatus described in Example 1 in 7 hours at 3 mm. Hg and 370° C. With a conversion of 85%, the yield of caprolactam was 75 g. corresponding to 75% of the reactant originally introduced into the process and 88% of the converted cyclehexanone oxime.

Example 5

20 g. of aluminum oxide of grain size 0.5 to 1 mm. and of the composition indicated in Example 1 were saturated with a solution of 5 g. of $HBF_4$ in 45 ml. of water, suction-filtered after 3 hours and then dried for 3 hours at 110° C. and heated for 5 hours at 500° C. The fluorine content was then 3.0%.

80 g. of cyclohexanone oxime were then passed for 5 hours over 5 g. of the resulting catalyst in the apparatus described in Example 1 at 3 mm. Hg and 400° C. At a conversion of 73%, the yield of caprolactam was 63 g. corresponding to 86% of the converted cyclohexanone oxime.

Example 6

20 g. of aluminum oxide of grain size 0.5 to 1 mm. and of the composition given in Example 1 were saturated with a solution of 5 g. of $H_2SiF_6$ in 45 ml. of water, suction-filtered after 3 hours and then dried for 3 hours at 110° C. and heated for 5 hours at 500° C. The fluorine content was then 2.9%.

(a) 82 g. of cyclohexanone oxime were then passed for 6.5 hours over 5 g. of the resulting catalyst in the apparatus described in Example 1 at 3 mm. Hg and 400° C. At a conversion of 74%, the yield of caprolactam was 66 g., corresponding to 89% of the converted cyclohexanone oxime.

(b) 90 g. of cyclohexanone oxime were passed for 3 hours over 3 g. of the resulting catalyst in the apparatus described in Example 1 at 11 mm. Hg and 250° C. At a conversion of 75%, the yield of caprolactam was 64.5 g. corresponding to 86% of the converted cyclohexanone oxime.

Example 7

90 g. of cyclohexanone and at the same time 5 g. of HF were conducted for 5 hours over 5 g. of aluminum oxide of grain size 0.5 to 1 mm. and of the composition given in Example 1, using the apparatus described in Example 1 at 9 mm. Hg and 350° C.

At a conversion of 68%, the yield of caprolactam was 49 g. corresponding to 80% of the converted cyclohexanone oxime.

Example 8

50 g. of aluminum silicate containing 87.5% by weight of siliciumdioxide and 12.5% by weight of aluminumoxide, having a grain size of 0.6 to 1 mm., a pore size of 82 A., a pore volume of 0.58 ml./g. and a surface of 300 m.$^2$/g. were added to a solution of 12.5 g. of $NH_4HF_2$ in 75 ml. of water. The mixture was evaporated and dried in vacuum (22 mm./Hg.) for 5 hours at 20° C. and for 8 hours at 120° C. 10 g. of the obtained product were used as catalyst. The reaction was carried out in a glass tube having a diameter of 2 cm., introducing during 5 hours 50 g. of cyclohexanonoxime at a pressure of 4 torr and at a temperature of 360° C.

Conversion: 96.7%. Yield of caprolactam: 45.5 g. corresponding to 94.1% of the charged cyclohexanonoxime.

Example 9

100 g. of the catalyst prepared according to Example 3 were treated with a solution of 16 g. of potassium hydroxide in 120 ml. of water (16 hours at room temperature and at 20 torr). After decanting the lye, the solid product is dried at 120° C. in vacuum.

Using 10 g. of this catalyst and contacting during 3 hours 73.5 g. of cyclohexanonoxime at a pressure of 3 torr and at a temperature of 360° C. with said catalyst, there were obtained 97% of caprolactam (conversion 91%).

What we claim is:

1. A process for the preparation of caprolactam by molecular rearrangement of cyclohexanone oxime in the gas phase in the presence of a solid acidic catalyst which comprises contacting at a temperature of from about 150° C. to about 600° C. cyclohexanone oxime with a solid acidic catalyst, said catalyst being at least one inorganic aluminum compound containing fluorine.

2. A process according to claim 1 wherein said contacting is effected at a temperature of about 250° to 450° C.

3. A process according to claim 1 wherein said catalyst additionally contains at least one oxide of a metal selected from the group consisting of alkali metals, alkaline earth metals, metals of main and subgroups II and IV of the Periodic System and heavy metals.

4. A process according to claim 3 wherein said oxide is present in an amount of up to about 35%.

5. A process according to claim 1 wherein the fluorine content of said catalyst ranges from 0.01% to 70% by weight.

6. A process according to claim 5 wherein the fluorine content of said catalyst is at least 0.1% by weight.

7. A process according to claim 1 wherein said catalyst is aluminum silicate containing fluorine.

8. A process according to claim 1 wherein said catalyst is aluminum fluoride.

9. A process according to claim 1 wherein said catalyst is a mixture of aluminum oxide and ammonium hydrogen fluoride.

References Cited

UNITED STATES PATENTS 2,234,566  3/1941  Lazier et al. _____ 260—239.3

FOREIGN PATENTS

| | | |
|---|---|---|
| 59,942 | 9/1941 | Netherlands. |
| 69,907 | 4/1952 | Netherlands. |
| 881,276 | 11/1961 | Great Britain. |
| 885,531 | 12/1961 | Great Britain. |

HENRY R. JILES, *Primary Examiner.*

R. T. BOND, *Assistant Examiner.*

U.S. Cl. X.R.

252—434, 438, 442, 463